E. MAJOT.
GAS AND AIR MIXER FOR GLASS FURNACES.
APPLICATION FILED MAY 26, 1921.

1,438,842.

Patented Dec. 12, 1922.
2 SHEETS—SHEET 1.

Inventor
Emile Majot
By
Attorney

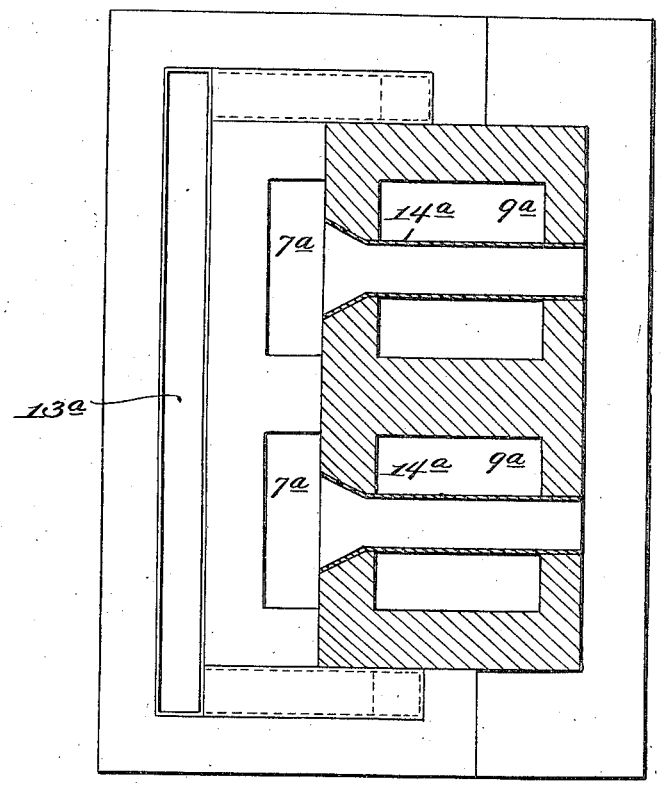

Patented Dec. 12, 1922.

1,438,842

UNITED STATES PATENT OFFICE.

EMILE MAJOT, OF BARNESVILLE, OHIO.

GAS AND AIR MIXER FOR GLASS FURNACES.

Application filed May 26, 1921. Serial No. 472,924.

*To all whom it may concern:*

Be it known that I, EMILE MAJOT, a citizen of the United States, residing at Barnesville, in the county of Belmont and State of Ohio, have invented new and useful Improvements in Gas and Air Mixers for Glass Furnaces, of which the following is a specification.

My present invention relates to improvements in gas-fired furnaces and it is applicable more particularly to glass furnaces, although it is applicable also to steel, iron and other similar furnaces using either natural or artificial gas as a fuel.

The invention is an improvement upon that disclosed by my former Patent No. 1,273,171, granted July 23, 1918, and its primary object is to provide improved means for mixing pre-heated air with the combustible gas to form the combustible mixture whereby a relatively higher furnace temperature is attained, with the result that melting of the glass or the desired treatment of other substances contained within the furnace is effected or completed more rapidly, and with a substantial conservation of fuel. These features are particularly advantageous in connection with glass furnaces, as the batch is melted more rapidly than heretofore, thus enabling the filling of more batch than usual into the tank of the furnace, the resulting glass is of an improved quality, and the glass worker is afforded better facilities for working the glass and the amount of work required of him is reduced, thus conducing to the production of a higher grade of glass-ware.

To these and other ends, the invention consists in certain improvements and combinations and arrangements of parts, all as will be hereinafter more fully described, the features of novelty being pointed out particularly in the claims at the end of the specification.

In the accompanying drawings:—

Figure 3 represents a horizontal section through a gas and air mixer constructed in accordance with the present invention and adapted for use in connection with iron or steel furnaces.

Figure 1:
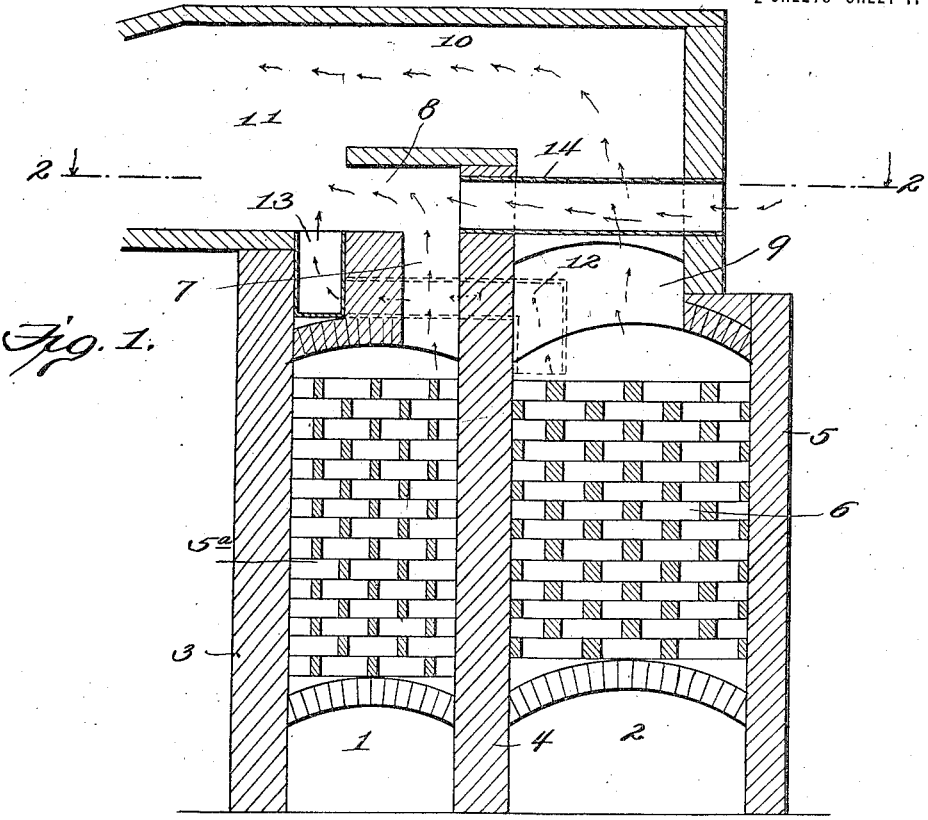
Figure 1 represents a section taken vertically through a gas and air mixer constructed in accordance with the present invention and particularly adapted for use in connection with a glass furnace.
Figure 2:
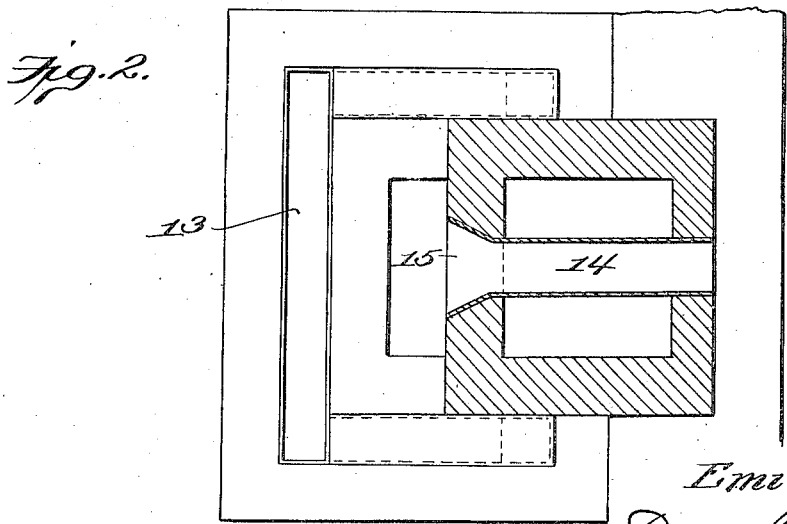
Figure 2 represents a horizontal section through the structure shown in Figure 1, the section being taken on the line 2—2 of Figure 1.

The present invention provides a gas and air mixer for furnaces employed for various purposes, although it is particularly advantageous when used in conjunction with glass furnaces of the general type shown and described in my prior patent above noted and to which patent reference is made for a full and detailed disclosure of the complete furnace. Figures 1 and 2 of the drawings show the gas and air mixer constructed for use especially in conjunction with glass furnaces of the type shown and described in my prior patent above noted, and Figure 3 shows the invention applied to a gas and air mixer which is especially adapted for use in conjunction with an iron or steel furnace. The preferred embodiments of the invention are shown in the drawings and will be hereinafter described in detail. It is to be understood, however, that the invention is not restricted to the precise constructions shown, as equivalent constructions are contemplated and these will be included within the scope of the claims.

In applying the invention to a glass furnace, it is to be understood that a suitable number of gas and air mixers will be grouped appropriately in relation to the glass tank, these mixers being usually and preferably arranged in groups at opposite sides of the glass tank, as is shown and described fully in my prior patent. Each mixer comprises a passage 1 which is connected to receive natural gas or producer or other suitable combustible, artificially-prepared gas, and a passage 2 connected to receive a supply of air which may be drawn through this passage into the mixer by the chimney draft of the furnace or the air may be forced into the passage 2 by other suitable means. The gas supply passage 1 is located in the bottom of the space formed between a pair of vertical walls 3 and 4 and in this space between the walls 3 and 4 is arranged a checker-work 5ª which may be of the usual kind employed in regenerative furnaces and composed of refractory brick assembled to provide interstices for the passage of gas therethrough. The air supply passage 2 is located in the bottom of the space between the vertical walls 4 and 5 of the furnace and the upper part of this space contains a checker-work 6 similar to the checker-work 5ª, air from the passage 2 passing upwardly through the interstices in the checker-work. In the operation of the glass furnace, especially those of the type shown and described in my prior patent above referred to, the mixers at one side of the glass tank operate to supply the combustible mixture to the furnace for a suitable period of time, during which period the highly heated products of combustion from the glass tank pass outwardly through and descend through the checker-work of the mixers at the opposite sides of the glass tank and thence pass to the chimney, these highly-heated products of combustion thereby heating the checker-works of the mixers through which the products of combustion escape from the furnace, and the operation is then reversed whereby the mixers through which the products of combustion previously escaped from the glass tank, will supply the combustible gas and air to the glass tank, and the mixers which previously supplied the combustible gas to the glass tank will serve as exits for the products of combustion. The alternate reversal of the operations of the mixers serves to highly heat the checker-works in the mixers and the gas and air ascending through the checker-works from the gas and air supply passages 1 and 2 respectively, become highly preheated before they are mixed and burned. The gas from the checker-work 5 ascends through a vertical passage 7 into a primary mixing chamber 8, while the main body of heated air from the checker-work 6 ascends through a vertical passage 9 and thence passes through a horizontal passage 10 into a secondary mixing chamber 11, the latter passage leading into the glass tank in which combustion of the mixed air and gas takes place. A supplementary flow of heated air from the checker-work 6 is conducted through branch passages 12 and the vertical passage 13 to the outlet of the primary mixing chamber 8, this supplementary flow of heated air forming a stratum beneath the body of gas which flows through the primary mixing chamber 8 from the passage 7, while the flow of air through the passages 9 and 10 forms an upper stratum of air above the body of gas which flows into the main mixing chamber 11 from the primary mixing chamber 8.

I have discovered that the batch, composed usually of silica sand, raw lime, salt cake and carbon, can be melted in much less time than has been possible heretofore, that a better grade of glass can be obtained and that the glass worker can work with greater facility and the amount of work required of him can be reduced by supplying a current of preheated air to the primary mixing chamber 8 in rear of the current of gas which is flowing out of this primary chamber 8 into the main mixing chamber 11. This additional supply of preheated air is produced by fitting a conduit or tube 14, of suitable refractory material, through the walls of the furnace which define the vertical air passage 9, the outer end of this conduit or tube extending through the outer wall of the furnace and air may be drawn either directly from the atmosphere by the natural draft of the tank or furnace, or it may be supplied by pressure, and a substantial portion of this conduit or tube 14 is subjected to the heating effect of the highly-heated air ascending in the air passage 9, so that the air introduced into the furnace through this conduit or tube 14 will be preheated to the necessary temperature. The outlet 15 at the inner end of the tube or conduit 14 communicates with the primary mixing chamber 8 preferably at the point where the vertical gas passage 7 leads into the primary mixing chamber 8, and the conduit or tube 14 is preferably arranged horizontally or substantially so, in order that the current of preheated air flowing into the primary heating chamber 8 through this conduit or tube will follow or push ahead of it the gas which enters the primary mixing chamber 8, through the vertical passage 7. Preferably, the mouth 15 of the conduit or tube 14 is flared in a horizontal plane, as is shown in Figure 2, in order to effect distribution of this supplementary air current substantially throughout the horizontal width of the mixing chamber 8. By introducing a supplementary supply of preheated air in the manner described, into the primary air and gas mixing chamber 8, an intimate mixture of air and gas is initially produced within the chamber 8, and when this initially-produced mixture of gas and air passes out of the primary mixing chamber 8 into the main mixing chamber 11, a lower stratum of air is supplied to the underside of this mixture from the air supply passage 13, and an upper stratum of air is supplied to this gas and air mixture from the air passage 11. When the gas and air mixture produced in this way discharges from the outlet of the chamber 11 into the glass tank, a highly-efficient combustion thereof ensues, it having been found that the batch in the glass tank is subjected to a relatively higher temperature than is usually obtainable, the batch is melted in a shorter time than that usually required, thus enabling the filling of more batch into the tank than is ordinarily possible, more efficient melting of the batch improves the quality of the glass and also the glass worker is enabled to work the glass with greater facility, thus producing better glassware, and the amount of work required of the glass-worker is reduced. Furthermore, a substantial economy in fuel required is effected.

In applying the invention to a gas and air mixer for use in conjunction with iron, steel and other similar furnaces, the gas and air may be supplied from gas and air passages and through checker-works similar to those shown in Figure 1, although it is preferable to construct the mixer in duplex form. As shown in Figure 3, a pair of gas supply passages 7ª is employed to supply gas to each primary mixing chamber, a pair of vertical air passages 9ª is used to supply air to the main mixing chamber 11, and a supplementary air passage 13ª, common to both gas supply passages 7ª, is used. In Figure 3 a pair of supplementary air supply conduits or tubes 14ª is employed to supply the supplementary air to the primary mixing chamber 8 at the points where the respective gas supply passages 7ª lead into the primary mixing chamber 8. The construction of the furnace shown in Figure 3 is otherwise the same as that shown in Figures 1 and 2, and its mode of operation is also substantially the same.

I claim as my invention:—

1. A gas and air mixer for furnaces comprising a primary gas and air mixing chamber, means for supplying preheated gas to said chamber, means for supplying preheated air to said chamber adjacent to the gas inlet thereto, means for supplying preheated air to said primary mixing chamber adjacent to its outlet, and a main mixing chamber arranged to receive the gas and air mixture from the outlet of the primary mixing chamber and embodying means for supplying additional preheated air to such mixture in the main mixing chamber.

2. A gas and air mixer for furnaces comprising a horizontally-extending primary gas and air mixing chamber, means for supplying preheated gas vertically to said mixing chamber, means for introducing a supply of preheated air horizontally into said mixing chamber at a point adjacent and above the point of admission of gas thereto and opposite to the outlet of said chamber, a main mixing chamber to receive the gas and air mixture initially produced in the primary mixing chamber, means for supplying preheated air to the main mixing chamber at a point adjacent to and below the outlet of the primary mixing chamber, and means for supplying preheated air to the main mixing chamber above the outlet of the primary mixing chamber.

3. A gas and air mixer for furnaces comprising heating means, the mixer having two passages with outlets located in a vertical plane, means for conducting air through the heating means and the upper of the two passages, means for conducting combustible gas to the lower of the two passages, the mixer having a third passage with an outlet located in a horizontal plane and in proximity to the lower of the outlets of the first-named passages, means for conducting air from the heating means through the third-named passage, and means for conducting heated air into the lower of the two first-named passages at a point opposite to its outlet.

4. A gas and air mixer comprising a pair of heating chambers having respectively gas and air passages extending vertically therefrom, a horizontally arranged passage connected to receive gas from its respective passage and having an outlet, a chamber connected to receive air from the respective vertical passage and also to receive fuel from said horizontally-arranged passage, means for admitting air into said chamber at a point adjacent to and below the outlet of said horizontally-arranged passage, and a conduit extending across the vertical air passage and leading into said horizontally-arranged passage opposite to its outlet for heating and introducing air into said horizontally-arranged passage.

In testimony whereof I have hereunto set my hand in presence of two subscribing witnesses.

EMILE MAJOT.

Witnesses:
ULYSSE A. DESSENT,
FLORA A. HOWELL.